United States Patent Office 3,639,596
Patented Feb. 1, 1972

3,639,596
METHOD OF TREATING LEG WEAKNESS IN FOWL WITH 25-HYDROXYCHOLECALCIFEROL
Hector F. De Luca and Milton L. Sunde, Madison, Wis., assignors to Wisconsin Alumni Research Foundation, Madison, Wis.
No Drawing. Filed July 14, 1969, Ser. No. 841,592
Int. Cl. A61k 15/02
U.S. Cl. 424—236       2 Claims

ABSTRACT OF THE DISCLOSURE

A method of treatment and prophylaxsis for leg weakness in fowl which comprises internally administering 25-hydroxycholecalciferol to the fowl.

---

This invention relates to a method of treatment and prophylaxsis for leg weakness in fowl.

In the breeding and raising of fowl for domestic purposes leg weakness and lameness in the birds can cause a significant economic loss. Although lameness can be caused by infectious diseases in the bird flock, the major preponderance of the total lameness problem is due to a non-infectious disease which involves primary damage to the skeletal or bone structures of the bird.

The disease or condition makes its appearance early in the life of the bird and is associated with a widened and irregular epiphyseal plate. Evidence suggests that there is a failure in calcification of newly formed cartilage resulting in a lesion similar to those observed in rickets. Symptomatic of the condition is a very early abnormal stance of the birds and a crooked leg appearance. Subsequently, the birds show a reduced ability to stand and exhibit a hopping or limping gait and, commonly, quivering of the legs. Eventually the birds may experience "slipped tendon" or perosis. The etiology of the disease is not known but the rachitic-like lesions suggest some abnormality related to vitamin D metabolism or in its action. (See "Leg Weakness" by R. H. McCapes, The Drumstick, vol. 10, No. 6, November 1966—an official publication of the California Turkey Industry Federation.)

Although the leg weakness condition has been observed in chickens, ducks, geese, pheasants and other fowl species, it is particularly evident in turkey flocks. The incidence of the condition in turkey flocks is about 5% but can range from about 3% to as high as 30%. The condition is suffered by both bronze and white turkeys and has been observed to be more prevalent in tom turkeys than in the females. Birds affected by the condition are usually cannibalized by the more healthy birds in the flock and even if they survive are not of marketable quality. Economically, in an industry where the profit margin is narrow, the incidence of the condition is of vital concern, for even a 3% incidence can spell the difference between profit and loss.

Prior to the present invention many attempts were made to reduce the incidence of leg weakness in fowl by various means. For example, various antibiotics were fed to the fowl in the belief that leg weakness was caused by an infectious disease. Although this expedient was of some value in reducing the incidence of infectious disease it was not effective for the elimination of or substantial reduction in the incidence of leg weakness not organism induced. It was also observed that birds receiving biotin deficient diets showed an increased incidence of leg weakness. However, bird flocks on diets containing sufficient biotin still show a high incidence of leg weakness.

It has now been found that leg weakness in fowl can be substantially eliminated by administering effective amounts of 25-hydroxycholecalciferol to the birds. Although the 25-hydroxycholecalciferol can be administered to the birds by various means, e.g. injection (intravenously or intramuscularly) the most convenient method is to include it in the birds' diet. The dosage is not critical but amounts should be sufficient in all cases to significantly reduce or eliminate the leg weakness condition. Administration of amounts of 25-hydroxycholecalciferol in excess of that needed to accomplish the ends sought should be avoided as economically unsound.

The following examples are intended to be illustrative only and are not to be construed as limiting the following claims.

EXAMPLE 1

A basal commercial-type turkey starting diet having the following composition was prepared.

TABLE 1

|  | G. |
|---|---|
| Soybean meal 50 | 500 |
| Ground corn | 385 |
| Choice white grease | 15 |
| Meat scraps | 20 |
| Fish meal | 20 |
| Alfalfa meal | 30 |
| Dicalcium PO$_4$ | 20 |
| CaCO$_3$ | 10 |
| NaCl | 3.0 |
| MnSO$_4$ | 0.33 |

|  | Mg. |
|---|---|
| Procaine penicillin | 10 |
| Riboflavin | 8.8 |
| Ca-pantothenate | 5 |
| Menadione bisulfite | 0.5 |
| Vitamin B$_{12}$ | 0.133 |
| Choline chloride | 420 |
| Niacin | 50 |
| α-Tacapherol acetate | 50 |

Vitamin A _____ 10,000 I.U./kg.

Of a total of about one hundred one-day old turkeys, fifty were fed the above basal diet containing, in addition, 1000 I.U. per kg. of vitamin D$_3$ while the second fifty were fed the same basal diet containing 1000 I.U. of 25-hydroxycholecalciferol per kg. The vitamin D$_3$ and 25-hydroxycholecalciferol were dissolved in cottonseed oil prior to addition to the diet. The feed was administered to 4 groups each of the turkeys with 12–13 birds in each group. The incidence of leg weakness observed at weekly intervals is reported in Table 2 below.

TABLE 2

| Additive | Percent of birds showing leg weakness after— | | | | |
|---|---|---|---|---|---|
|  | 1 week | 2 weeks | 3 weeks | 4 weeks | 5 weeks |
| Vitamin D$_3$ | 5.9 | 5.9 | 7.85 | 7.85 | 7.85 |
| 25-hydroxychole-calciferol | 0.0 | 0.0 | 0.0 | 0.0 | 1.92 |

It is evident from the above Table 2 that 25-hydroxycholecalciferol was effective to drastically reduce the incidence of leg weakness. Moreover the addition of the 25-hydroxycholecalciferol had no significant effect on the feed efficiency or the weight gain of the birds. The mortality rate was 2 per 51 birds on the basal diet and 1 per 52 birds on the basal diet with added 25-hydroxycholecalciferol.

EXAMPLE 2

200 turkeys poults, one day old, in eight groups of 12–13 poults per group were placed on the same basic diet as in Example 1 except that the calcium in the diet was increased to a value of 1.8% by weight of the diet. A high calcium diet is known to increase the incidence of leg weakness in the birds. Again one half of the birds received the basal diet supplemented by the addition of 1000 I.U./ kg. of vitamin $D_3$ while the other half received the basal diet supplemented by the addition of 1000 I.U./kg. of 25-hydroxy-cholecalciferol. The incidence of leg weakness observed at weekly intervals is indicated in the table below.

TABLE 3

| Additive | Percent of birds showing leg weakness after— | | | | |
|---|---|---|---|---|---|
| | 1 week | 2 weeks | 3 weeks | 4 weeks | 5 weeks |
| Vitamin $D_3$ | 18.2 | 27.6 | 23.5 | 16.5 | |
| 25-hydroxycholecalciferol | 16.0 | 13.1 | 8.1 | 3.1 | |

It is evident from the above data that the administration of 25-hydroxycholecalciferol markedly and progressively reduced the incidence of leg weakness showing its effectiveness in preventing that condition.

The addition of 25-hydroxycholecalciferol had no significant effect on the feed efficiency and tended to increase the weight gain of the birds. The mortality rate of 2/100 was the same for each major group of 100 birds.

It is understood that the 25-hydroxycholecalciferol can be administered in other than the cottonseed oil vehicle specifically mentioned. Any nontoxic solvent compatible with 25-hydroxycholecalciferol and the feed ingredients can readily be used. Also, it may be found convenient to use 25-hydroxycholecalciferol in its mono or diester form, e.g. as the diacetate, with compatibility and effectiveness for the purposes of this invention comprising the only limitations.

Having thus described the invention what is claimed is:

1. The method of treatment and prophylaxsis for leg weakness condition in fowl which comprises internally administering to the fowl 25-hydroxycholecalciferol or the mono- or diacetate thereof in an amount sufficient to alleviate or prevent said condition.

2. The method of claim 1 in which 25-hydroxycholecalciferol is administered to the fowl as an ingredient in feed.

References Cited

UNITED STATES PATENTS 3,032,468  5/1962  Ham et al. _____ 424—236

SAM ROSEN, Primary Examiner